(12) United States Patent
Sage

(10) Patent No.: US 7,413,230 B1
(45) Date of Patent: Aug. 19, 2008

(54) CARGO BARRICADE FOR A TRUCK BED

(76) Inventor: Ronald K. Sage, 6417 Chippendale Rd., Lakeland, FL (US) 33809

( * ) Notice: Subject to any disclaimer, the term of this patent is extended or adjusted under 35 U.S.C. 154(b) by 59 days.

(21) Appl. No.: 11/473,556

(22) Filed: Jun. 23, 2006

Related U.S. Application Data

(60) Provisional application No. 60/693,615, filed on Jun. 24, 2005.

(51) Int. Cl.
*B62D 33/08* (2006.01)
(52) U.S. Cl. .................................................. 296/26.08
(58) Field of Classification Search ............. 296/26.08, 296/26.01, 37.6, 50, 51, 57.1, 61
See application file for complete search history.

(56) References Cited

U.S. PATENT DOCUMENTS 6,641,190 B2 * 11/2003 Kirchhoff ................. 296/26.11
7,111,885 B1 * 9/2006 Hoffmann et al. ......... 296/26.11

* cited by examiner

*Primary Examiner*—H Gutman
(74) *Attorney, Agent, or Firm*—Kenneth L Tolar

(57) ABSTRACT

A cargo barricade for retaining oversized cargo within a truck bed includes a base component having front and rear sections which are secured to the front and rear surfaces of a tailgate respectively. The front and rear sections each include a male dovetail fastener to which a plurality of intermediate sections can be slidably mounted. A header is mounted on upper ends of the intermediate sections and a fastening strap is secured about the assembly to unitarily secure it to the tailgate.

6 Claims, 2 Drawing Sheets

CARGO BARRICADE FOR A TRUCK BED

CROSS REFERENCE TO RELATED APPLICATIONS

This application is entitled to the benefit of provisional application No. 60/693,615 filed on Jun. 24, 2005, the specification of which is incorporated herein by reference.

BACKGROUND OF THE INVENTION

The present invention relates to a cargo barricade for securing to a pickup truck tailgate to retain oversized cargo within the truck bed.

DESCRIPTION OF THE PRIOR ART

Pickup trucks are routinely used to transport various cargo. Often, it is necessary to transport oversized freight such as lumber or ladders that extend well beyond the tailgate. In such event, the items are susceptible to sliding or shifting thereby causing damage to the truck bed, the tailgate or possibly other drivers. Accordingly, there is currently a need for a device for conveniently securing oversized cargo within a truck bed. The present invention addresses this need by providing a uniquely designed cargo barricade that fastens to a truck tailgate to retain protruding cargo within the truck bed.

SUMMARY OF THE INVENTION

A cargo barricade for retaining oversized cargo within a truck bed includes a base component having front and rear sections which are secured to the front and rear surfaces of a tailgate respectively. The front and rear sections each include a male dovetail fastener to which a plurality of intermediate sections are slidably mounted. A header is mounted on upper ends of the intermediate sections and a fastening strap is secured about the assembly to firmly secure it to the tailgate.

It is therefore an object of the present invention to provide a device that secures oversized cargo within a truck bed.

It is another object of the present invention to provide a device that eliminates the danger and inconveniences associated with transporting oversized cargo within a truck bed.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
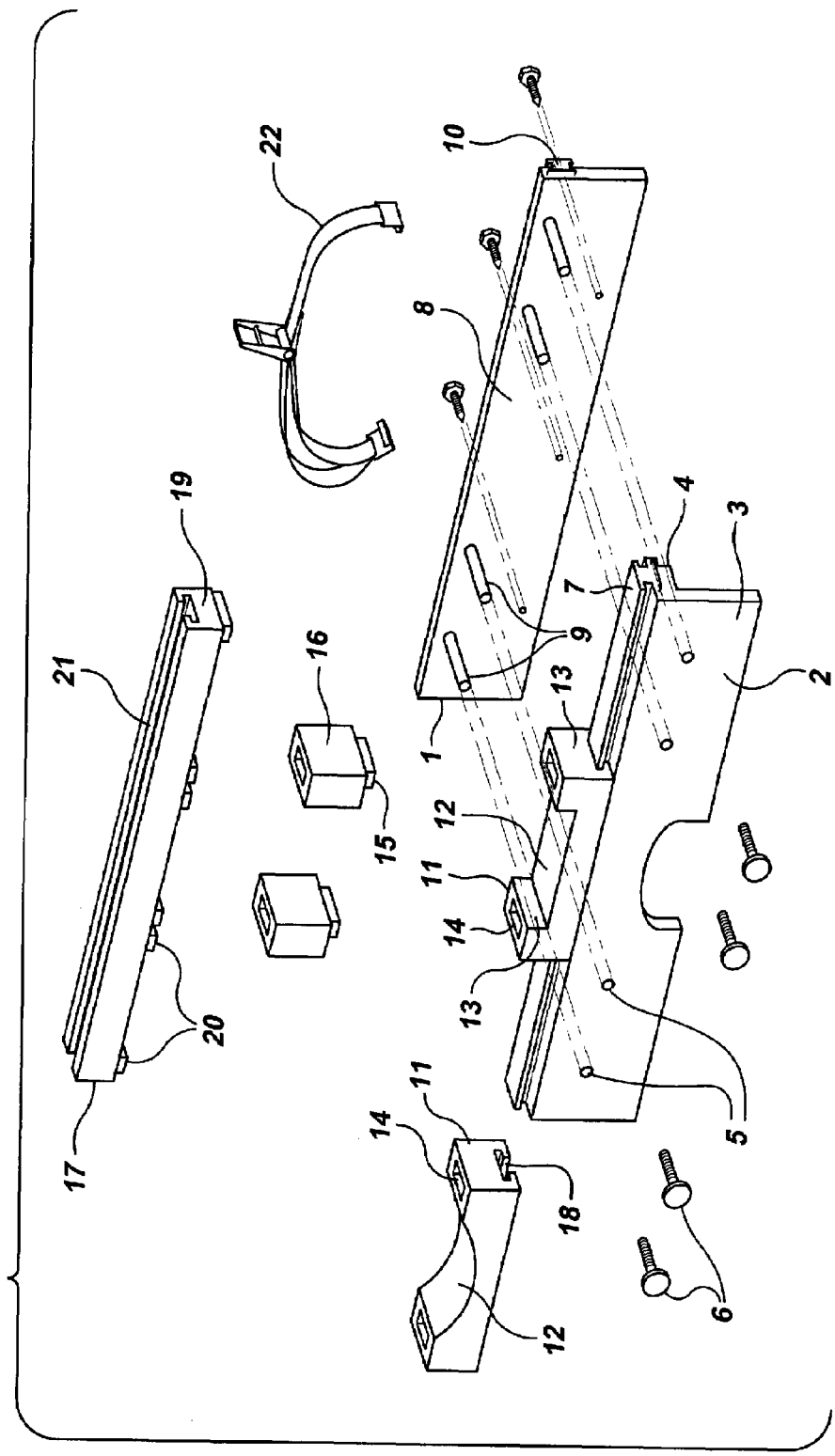
FIG. 1 is an exploded view of the cargo barricade according to the present invention.
Figure 2:
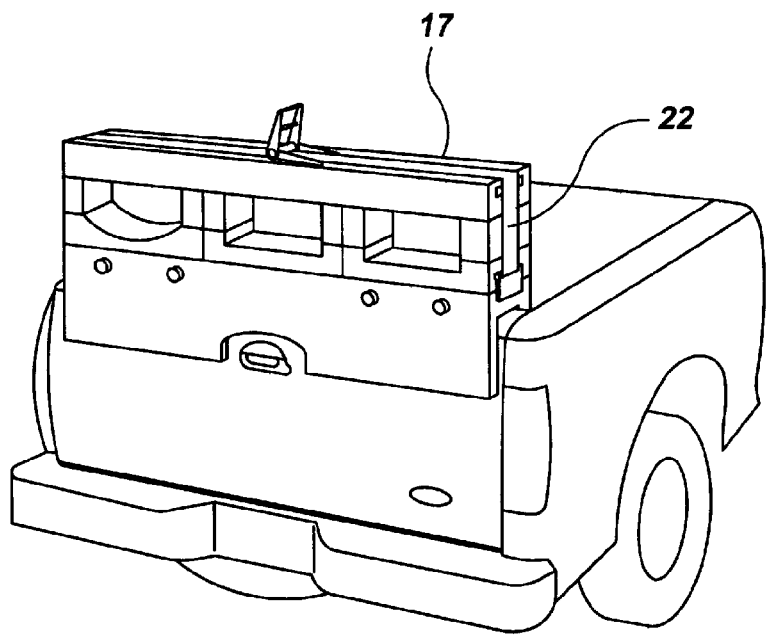
FIG. 2 depicts the cargo barricade mounted on a raised truck bed tailgate.
Figure 3:
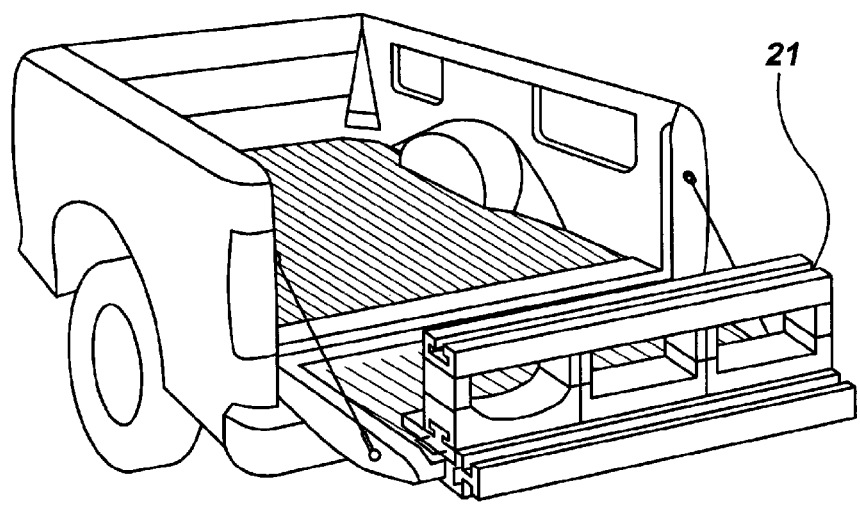
FIG. 3 depicts the cargo gate secured to a lowered truck bed tailgate.

The present invention relates to a cargo barricade for a truck bed. The device comprises a base component formed of a front section 1 and a rear section 2. The rear section is substantially L-shaped and is formed of a planar, vertical panel 3 with a lip 4 horizontally extending from a top edge thereof. A plurality of apertures 5 are positioned on the panel that receive fastening screws 6 to secure the rear section to the front section as described in more detail, infra. Longitudinally disposed on the upper surface of the lip is a male, sliding dovetail type fastener 7.

The front section includes an elongated panel 8 having a rear surface with a plurality of tubular, hollow dowels extending therefrom 9. A male sliding dovetail type fastener 10 is longitudinally positioned on the front surface of the front section.

A plurality of intermediate sections 11 are slidably mountable on either of the male dovetail fasteners depending upon the orientation of the tailgate. Each intermediate section is substantially U-shaped and includes an upper surface 12 that is either planar or convex with a pair of opposing upturned portions 13 extending therefrom. Each upturned portion includes a receptacle 14 for receiving a nipple 15 depending from an extension post 16 or a header 17. Each intermediate section also includes a channel 18 formed on the lower surface thereof that is dimensioned and configured to slidably receive either of the male dovetail fasteners on the base component.

The header 17 includes an elongated beam 19 having a plurality of nipples 20 depending from the lower surface thereof that are each inserted into a respective receptacle on an extension section or an intermediate section. A longitudinal slot 21 is formed on the upper surface of the beam that receives an accompanying length adjustable strap 22 to retain the components in a unitary configuration.

To erect the barricade, a user places the rear section of the base component on the rear surface of the tailgate with the lip on the top edge thereof. The front section is placed on the front surface of the tailgate and the tubular dowels are aligned with the screw apertures and screws are secured therein. The intermediate sections are slidably mounted on the rear portion lip if the tailgate is to remain in a raised position. If the size of the cargo is such that the tailgate must be in the lowered position, the intermediate sections are slidably attached to the dovetail fastener on the front surface of the base component rear section. If the size of the cargo requires the barricade to be elevated, the extension posts are secured to each of the intermediate sections. The header beam is then mounted over each of the extension sections, or the intermediate sections. The strap is threaded within the beam slot and is secured at each of two ends to an end of the base component.

The above described device is not limited to the exact details of construction and enumeration of parts provided herein. Furthermore, the size, shape and materials of construction can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A cargo barricade for a truck bed comprising:
   a base component formed of a front section and a rear section, wherein said rear section is substantially L-shaped and is formed of a planar, vertical panel with a lip horizontally extending from a top edge thereof;
   means for securing said rear section to said front section with a truck tailgate disposed therebetween;
   a plurality of intermediate sections removably attached to said rear section;
   a header removably attached to said intermediate sections whereby said base component, said intermediate sections and said header form the barricade on said tailgate to retain cargo within the truck bed;

a dovetail type fastener longitudinally disposed on an upper surface of the lip.

2. The cargo barricade according to claim 1 wherein said front section includes a front surface having a dovetail type fastener longitudinally positioned thereon.

3. The cargo barricade according to claim 2 wherein said intermediate sections each include a channel adapted to slidably mate with either of the dovetail type fastener on said front section or the dovetail type fastener on said rear section.

4. The cargo barricade according to claim 3 further wherein each intermediate section is substantially U-shaped and includes a pair of opposing upturned portions extending therefrom, each upturned portion including a receptacle.

5. The cargo barricade according to claim 4 wherein said header includes a plurality of nipples depending therefrom each for inserting into one of said receptacles on said intermediate sections.

6. The cargo barricade according to claim 5 wherein said header includes an upper surface having a longitudinal slot formed thereon for accommodating a length-adjustable strap to retain the base component, intermediate sections and said beam in a unitary configuration.

* * * * *